US006217316B1

(12) United States Patent
Yeh

(10) Patent No.: US 6,217,316 B1
(45) Date of Patent: Apr. 17, 2001

(54) SUPPORT FOR A TORCH

(76) Inventor: Jui-Ju Yeh, 14th Fl., No. 223, Sec. 5, Nanking E. Rd., Taipei (TW)

( * ) Notice: Subject to any disclaimer, the term of this patent is extended or adjusted under 35 U.S.C. 154(b) by 0 days.

(21) Appl. No.: 09/480,364

(22) Filed: Jan. 10, 2000

(51) Int. Cl.⁷ .................................................. F23D 11/36
(52) U.S. Cl. ......................... 431/343; 362/396; 431/146; 431/320
(58) Field of Search .................................. 431/146, 320, 431/343, 119, 344, 345, 148, 125, 322, 324; 362/431, 396, 161, 159, 415, 810

(56) References Cited

U.S. PATENT DOCUMENTS

| | | | |
|---|---|---|---|
| 223,376 | * | 1/1880 | Newton .................................. 431/119 |
| 535,559 | * | 3/1895 | Salsbury ................................ 431/324 |
| 1,819,733 | * | 8/1931 | Castelli ................................. 362/431 |
| 4,494,177 | * | 1/1985 | Matthews .............................. 362/402 |
| 5,163,752 | * | 11/1992 | Copeland et al. .................... 362/396 |
| 5,547,371 | * | 8/1996 | Rose ...................................... 431/320 |
| 5,807,093 | * | 7/1998 | Tendick ................................. 431/343 |
| 5,823,658 | * | 10/1998 | Doddy ................................... 362/396 |
| 5,938,430 | * | 8/1999 | Majerowski .......................... 431/343 |
| 6,039,464 | * | 3/2000 | Esprit .................................... 431/343 |
| 6,086,228 | * | 7/2000 | McGowan et al. ................... 362/396 |

* cited by examiner

Primary Examiner—Ira S. Lazarus
Assistant Examiner—David Lee
(74) Attorney, Agent, or Firm—William E. Pelton, Esq.

(57) ABSTRACT

A support for a torch is disclosed. The support has a shank, a torch seat formed on the first end of the shank, a retainer provided on the second end of the shank. The retainer has a U-shaped bracket, a through hole defined in a face of the bracket, an extension screwed through the through hole, a handle integrally formed on the first end of the extension and a backing plate securely attached to the second end of the extension. Therefore, a gap defined between the backing plate and the inner face of the bracket is able to be adjusted by rotating the extension so as that the retainer is able to clamp an object to stand the support in an upright position.

1 Claim, 5 Drawing Sheets

SUPPORT FOR A TORCH

BACKGROUND OF THE INVENTION

1. Field of the Invention

The present invention is related to a support for a torch and more particularly to a support providing good rigidity and safety.

2. Description of Related Art

Outdoor activities at night, such as concerts, evening picnics, etc. are becoming increasingly popular, and torches are an attractive device to illuminate the area. The torches must be held at a height that enables maximum illumination and safety. A conventional support for a torch comprises a shank, a frame on the top of the shank to contain a fuel case and a spike at the bottom end of the shank to be stuck into the ground.

Because the spike is crude, it is not easy to be inserted it into hard ground when the weather has been very dry or very cold.

A conventional torch stand is shown in the Fig.5. To obviate the aforementioned problem, a rail (92) is provided at a suitable position on the shank (90) so the user can easily press the rail (92) with a foot in order to drive the spike into the ground until the rail (92) is flush with the ground.

Because there is only one rail (92) to abut the ground, the support for the shank (90) is not very safe. That is, it is easy for the torch to lean or fall when there is an external force exerted on the torch. This kind of support can only be used in the ground. It cannot be used on a fence as a decoration or for illumination.

An objective of the invention is to provide an improved support for a torch to mitigate and/or obviate the aforementioned problems.

SUMMARY OF THE INVENTION

The main objective of the invention is to provide a support for a torch, on the bottom of which a retainer is provided for support, so as that the support can be mounted on a fence for illumination or as a decoration.

Still, another objective of the invention is to provide a support for a torch, in which the middle portion provides rigidity and a grip portion.

Objects, advantages and novel features of the invention will become more apparent from the following detailed description when taken in conjunction with the accompanying drawings.

DETAILED DESCRIPTION OF PREFERRED EMBODIMENT

Figure 1:
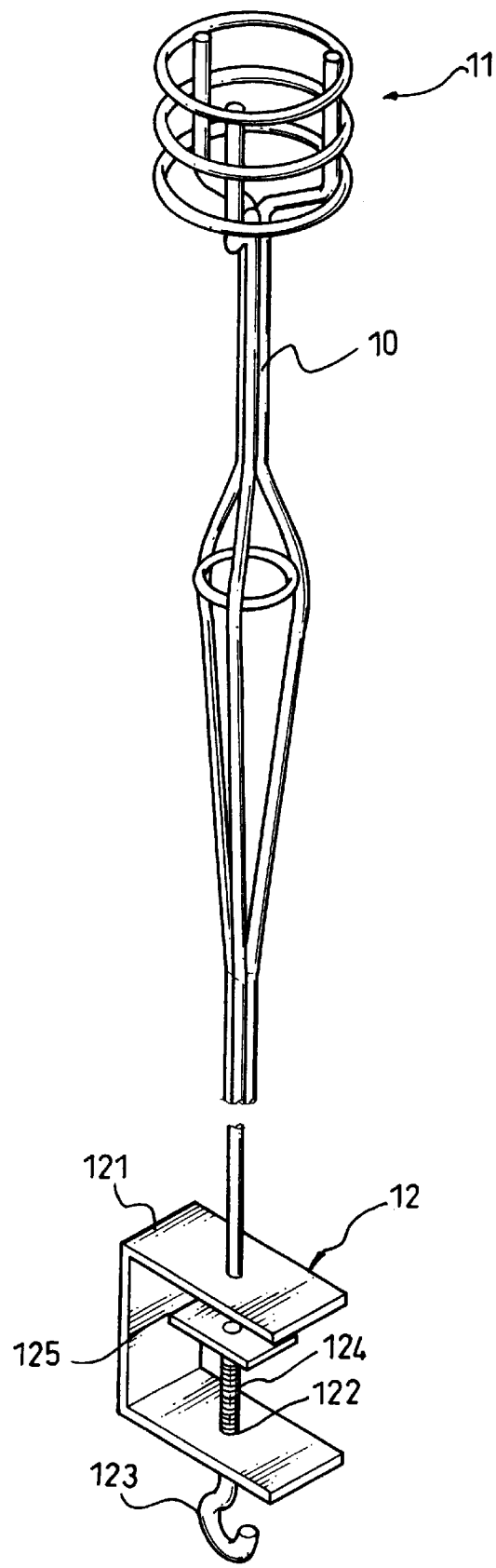
FIG. 1 is a perspective view of the torch support in accordance with the present invention.
Figure 2:
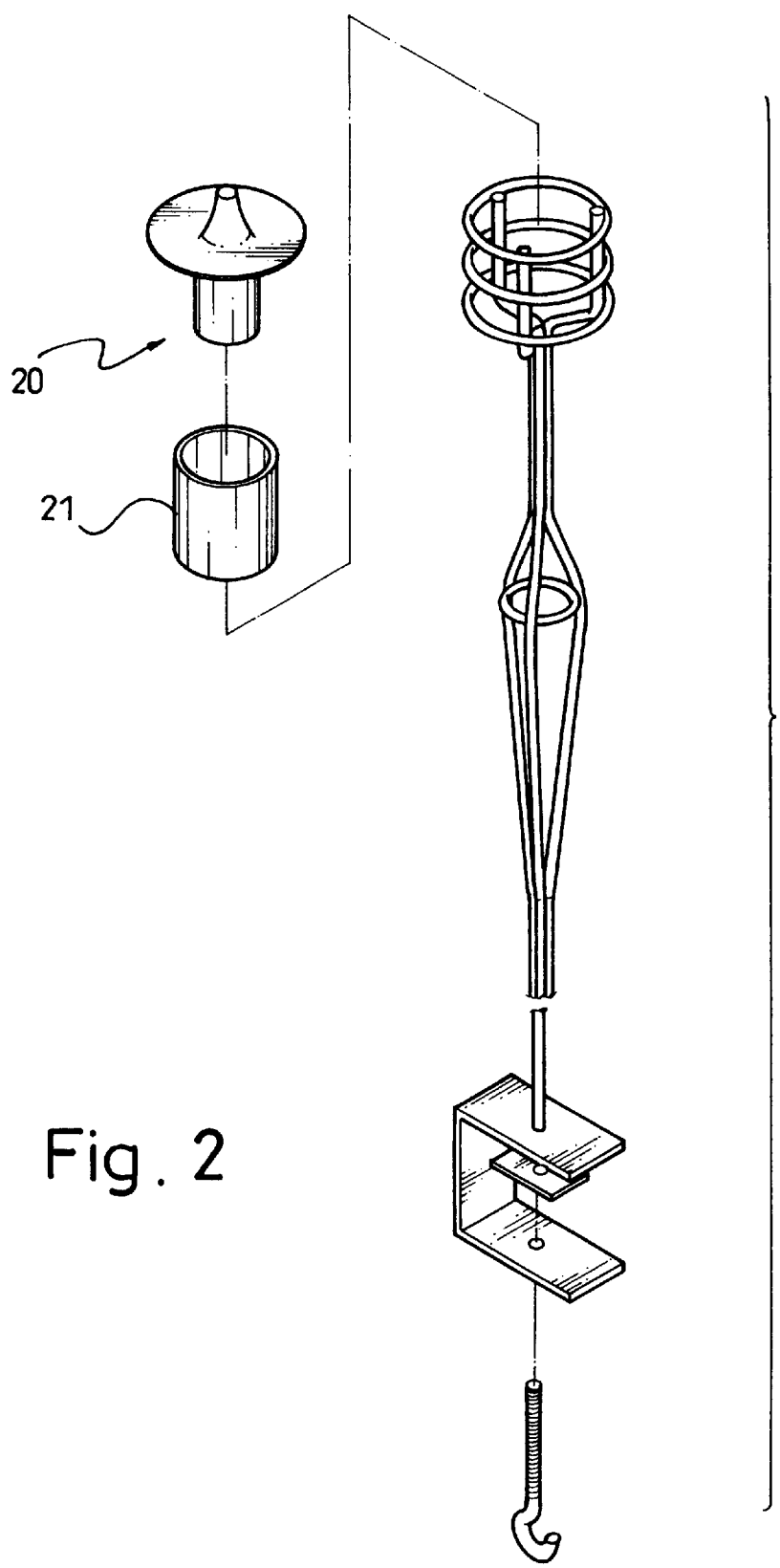
FIG. 2 is an exploded perspective view of the torch support in FIG. 1 and a fuel reservoir with a housing.

Referring to FIGS. 1 and 2, a support for a torch (not shown) includes a shank (10), a circular torch seat (11) formed on or securely attached to the first distal end of the shank (10) and a retainer (12) securely attached to the second distal end of the shank (10). The circular torch seat (11) is provided to hold a fuel reservoir (20) (as shown in FIG. 2) with a hollow housing (21) mounted outside the fuel reservoir (20) to protect the fuel reservoir (20) from damage and having a closed end (not numbered). The retainer (12) includes a U-shaped bracket (121) with a threaded hole (122) defined therethrough, a handle (123) with a threaded extension (124) screwed through the hole (122) and a backing plate (125) securely attached to the free end of the extension (124).

Figure 3:
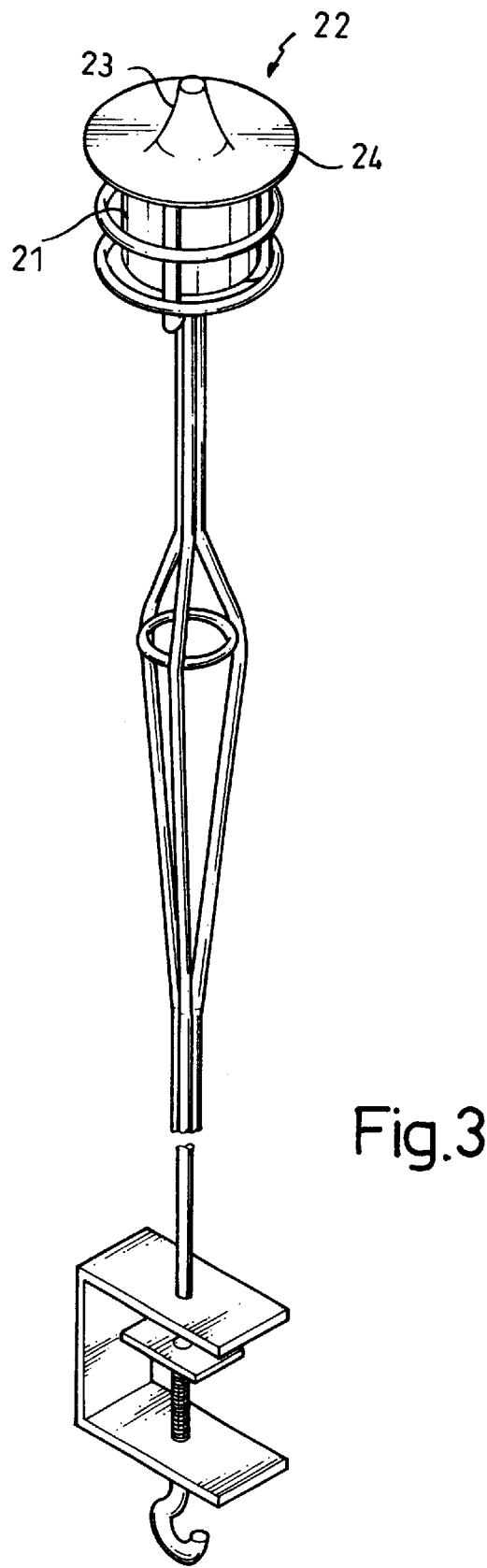
FIG. 3 is a perspective view of the torch support in FIG. 1 with the fuel reservoir in FIG. 2 being in the torch support.

With reference to FIG. 3 and still taking FIG. 2 for reference, the fuel reservoir (20) has a cover (22) screwed onto the reservoir (20) and is provided with a mouth (23) in the center of the cover (22). Before the fuel reservoir (20) is placed in the circular torch seat (11), the housing (21) is placed inside the torch seat (21) to hold the fuel reservoir (20). Furthermore, the cover (22) may be provided with a flange (24) formed on the outer periphery of the cover (20) and having a diameter larger than that of the torch seat (11) such that when the fuel reservoir (20) is placed in the torch seat (11), the flange (24) is able to abut the distal edge of the torch seat (11) to keep the mouth (23) outside the torch seat (11).

Figure 4:
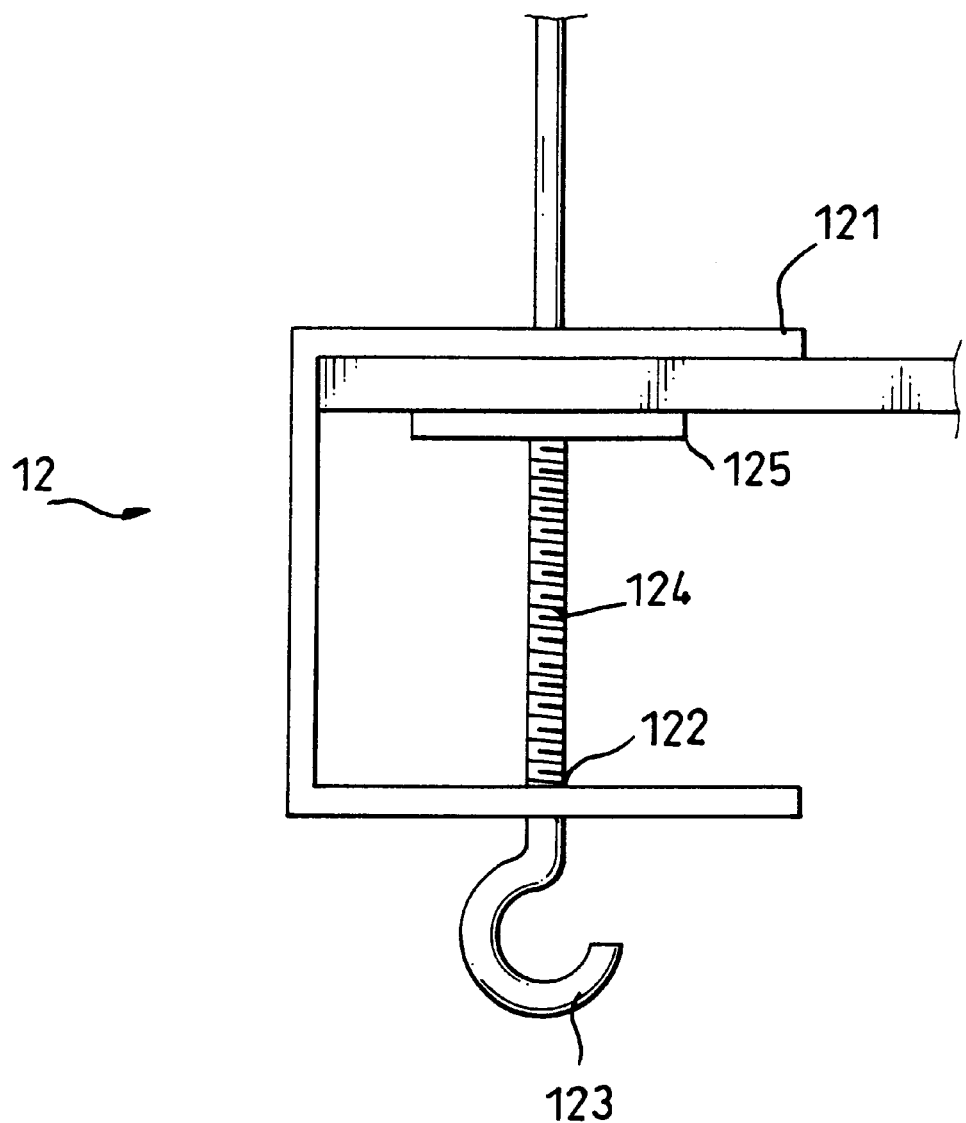
FIG. 4 is a side plan view of the support retainer in FIG. 1 clamped to a plate-like object to hold the support erect.
Figure 5:
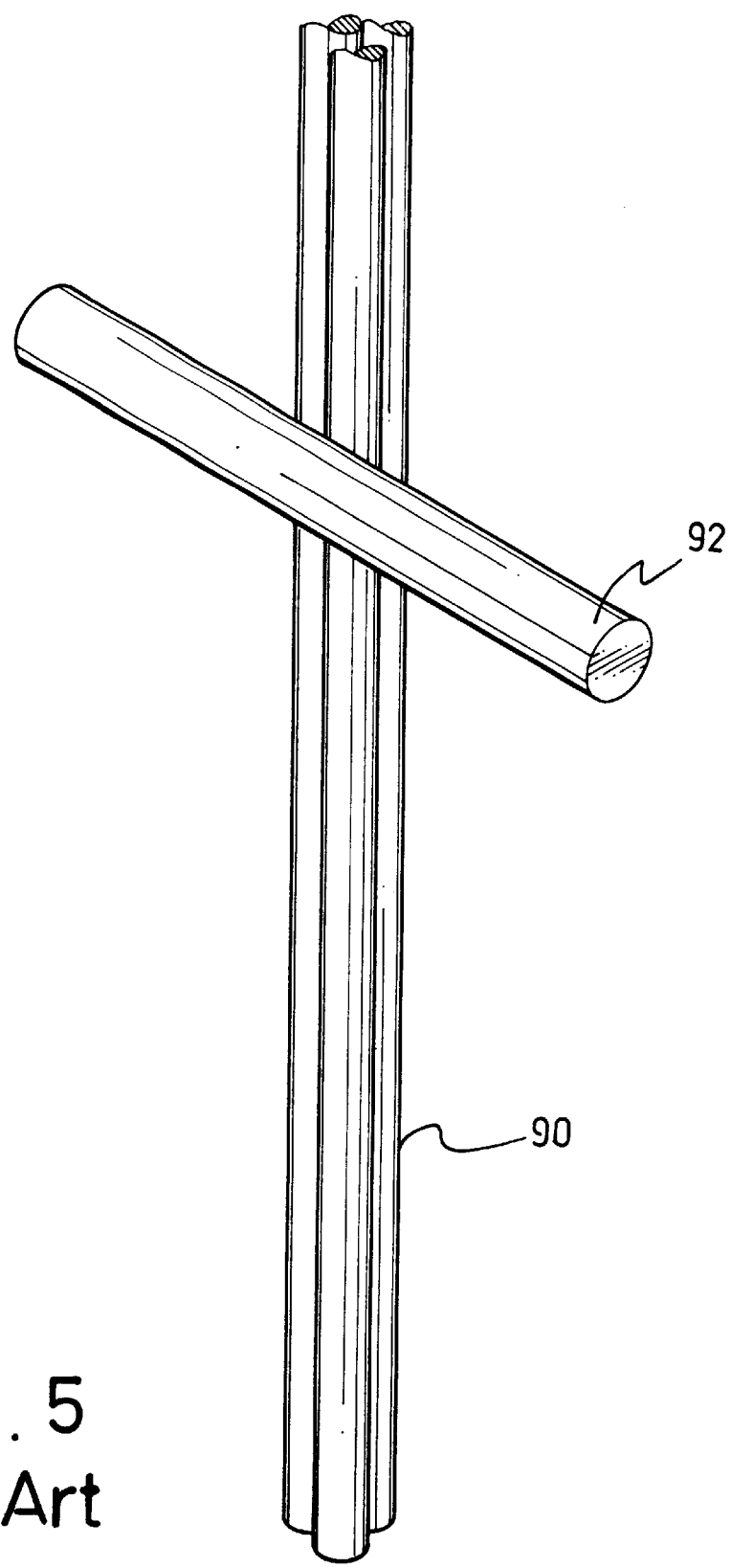
FIG. 5 is a perspective view of a conventional support for a torch, wherein a rail is mounted on the support.

With reference to FIG. 4, because the extension (124) is screwed through the hole (122) and the backing plate (125) is securely mounted on the distal end of the extension (124), the gap defined between the backing plate (125) and the inner face of the bracket (121) can be adjusted to adapt to various objects such as a piece of wood, a fence rail, a table, etc. The handle (123) may be configured into any suitable shape to facilitate the rotation of the extension (124). For example, the handle (123) may be a hook as shown in the accompanying drawings such that the rotation of the extension to adjust the gap between the backing plate (125) and the inner face of the bracket (121) is facilitated. When the support is to be used on a fence as a decoration or for illumination, the user is able to use the backing plate (125) of the retainer (12) to firmly clamp a piece of board so as to securely attach the support on the fence.

From the aforementioned description, the following advantages of the invention can be concluded:

1. Simple structure:

The retainer has a bracket, an extension and a backing plate movably mounted in the bracket. The retainer is able to hold the support in an upright position by the rotation of the extension and the resultant movement of the backing plate to clamp an object. Therefore, the operation and the structure of the retainer are easy and simple.

2. Easy to mount/dismount the support

Due to the retainer, the mounting and dismounting of the support is easy and will not damage the surface of the object.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A support for a torch, the support comprising:

a shank;

a circular torch seat securely mounted on the first distal end of the shank;

a retainer securely mounted on the second distal end of the shank and having a U-shaped bracket with a threaded hole defined therethrough, an extension with a handle screwed through the hole and a backing plate securely mounted on the free end of the extension;

a fuel reservoir having a cover engaged with the reservoir and provided with a mouth in the center of the cover, the outer periphery of the cover defining a flange having a diameter larger than that of said torch seat so that when the fuel reservoir is within said torch seat, the flange engages the perimeter of said torch seat; and a hollow housing received in the circular torch seat and having a closed end so as to receive the fuel reservoir therein.

* * * * *